May 23, 1950 — M. BOZOIAN — 2,508,370
ELECTRONIC INDICATING CIRCUIT
Filed Aug. 30, 1947 — 2 Sheets-Sheet 1
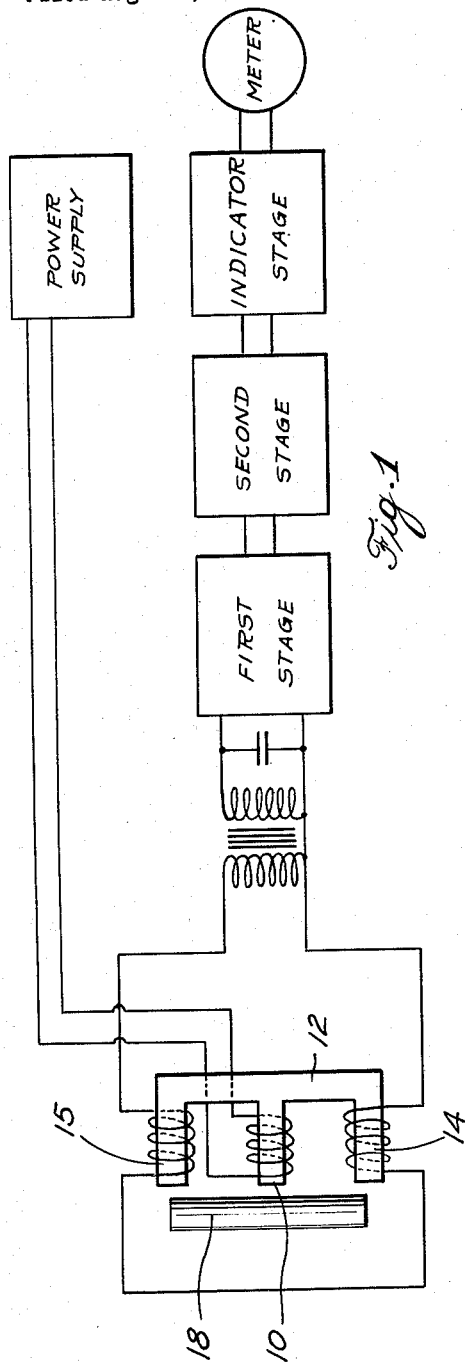
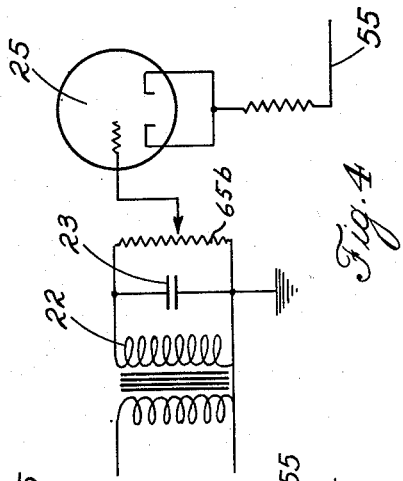
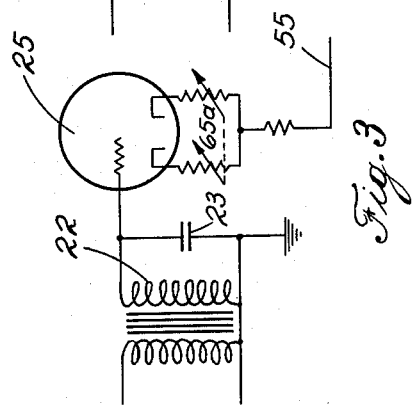
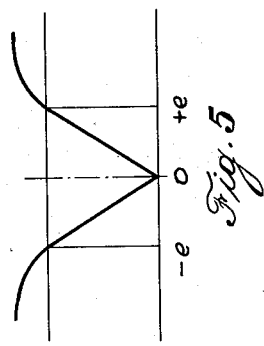
INVENTOR.
MICHAEL BOZOIAN
BY Bosworth & Sessions
ATTORNEYS

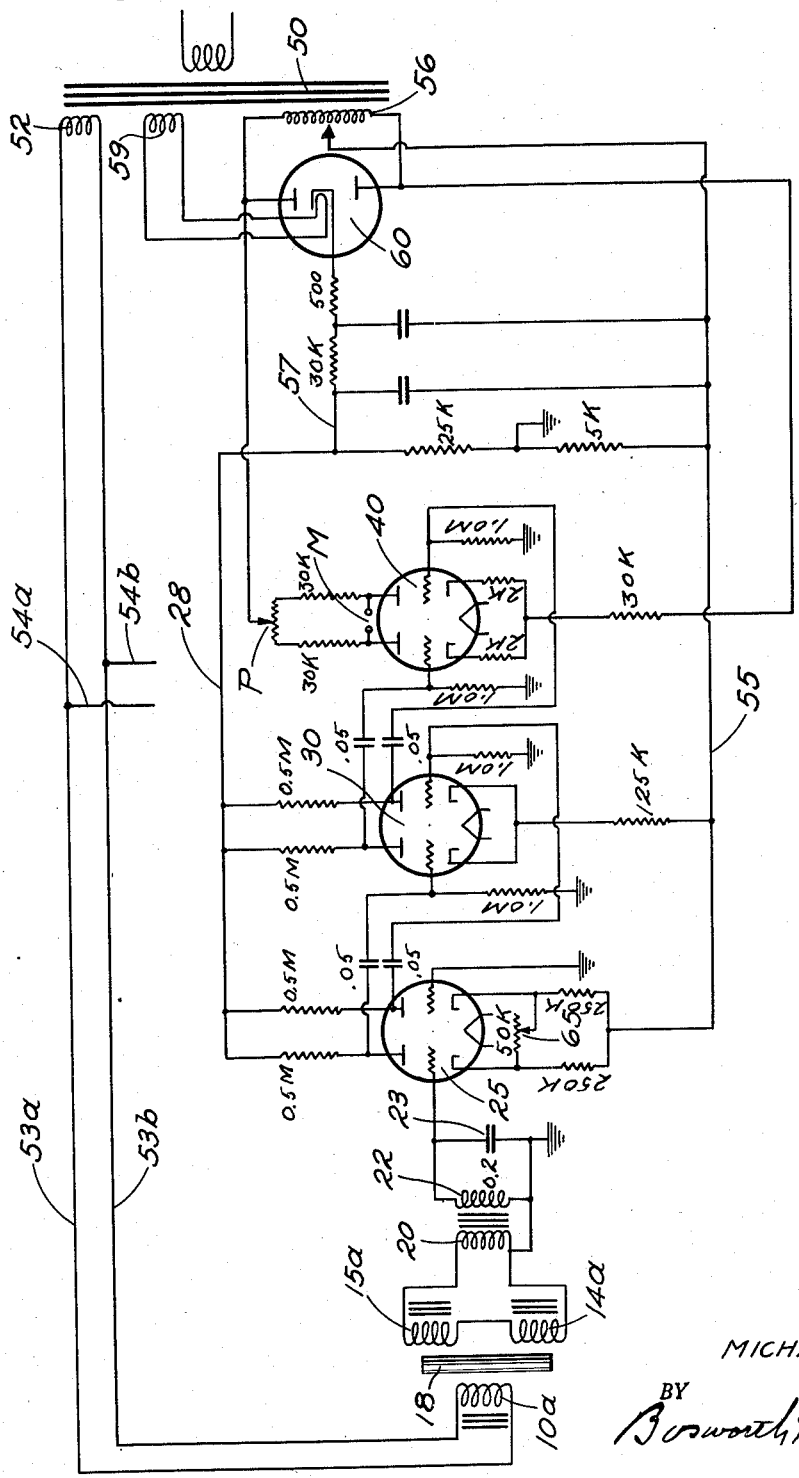

Patented May 23, 1950

2,508,370

UNITED STATES PATENT OFFICE 2,508,370

ELECTRONIC INDICATING CIRCUIT

Michael Bozoian, Ann Arbor, Mich., assignor, by mesne assignments, to Graham-Mintel Instrument Company, Cleveland, Ohio, a corporation of Ohio Application August 30, 1947, Serial No. 771,528

7 Claims. (Cl. 177—351)

This invention relates to low frequency vacuum tube measuring circuits and a method for their use and more particularly to circuits in which a signal from a low frequency pickup is amplified and interpreted by a meter or other indicating device connected across the plates or anodes of a double triode indicator tube or its equivalent.

The use of electronic amplification to magnify a high frequency signal from a detecting device is known but insofar as I am aware no use has been made of low frequency alternating current (on the order of 60 cycles) as an energy source in a pickup. Such prior circuits have not made available to the indicator a signal with linear characteristics or one that was symmetrical so it could be read on either side of a zero point. Furthermore the circuits were not stable. The output signal strength from such prior circuits has been insufficient to drive anything but a delicate meter and a rugged meter, a recorder or other indicating device requiring appreciable power could not be used satisfactorily.

To meet the foregoing and other objections with prior circuits and apparatus it is a general object of the present invention to provide an improved and more stable system of the phase sensitive type than any heretofore known. Another object is to provide a circuit in which the signal input is at a relatively low frequency; for example 60 cycles, and is in phase or out of phase with the alternating current that is supplied by the power supply unit. An additional object is to provide a system in which the indication is symmetrical on either side of zero and is linear over the range of the instrument. Still an additional object is to provide a system selective to a single input frequency and thus relatively unresponsive to spurious signals and electrical noises. A further object of the invention is to provide an amplifier in which each stage employs negative feedback to stabilize its performance, particularly in the event of an appreciable change in the D. C. voltage impressed on the anode of the tube in this stage. Still a further object is to provide an indicator stage in which the indicator is connected across the anodes of a double triode tube or across the anodes of two matched tubes in parallel, provision being made for use of a potentiometer associated with the indicator to adjust its zero point.

Other objects of the invention will become apparent from the specification and from the accompanying drawings while the novel features are summarized in the claims.

Referring now to the drawings: Figure 1 is a block diagram illustrating the components of the circuit of the present invention; Figure 2 is a detailed diagram of the circuit employed; Figures 3 and 4 are fragmentary diagrams of the circuit showing different resistance arrangements for balancing and gain control at the first amplifier stage; and Figure 5 is a curve illustrating the meter response in the indicator stage showing the substantially linear characteristic of the signal within its useful range.

The present invention is adapted for use in making measurements within a range of a few micro-inches and is adapted for use under many different conditions one of which is with an instrument similar to an ordinary micrometer. In this case one arm of the instrument contains a fixed or anvil surface and the opposite arm supports a contact mounted for movement as a unit with a movable pole piece in a direction normal to the anvil surface. As the pole piece is moved it alters the flux field of a pickup unit as hereafter described to provide the input signal to the indicator circuit. The instrument arm that carries the pickup unit is adjustable with respect to the anvil so that the device can be set with a calibrated gauge block to read zero when the gauge block is inserted. The amount by which the article to be measured deviates in size from the gauge block is then indicated by deflection of the meter pointer to either side of zero as the detector arm causes the movable pole piece to shift and establish a signal that is amplified and fed to the meter.

Generally the invention embodies a pickup of novel design employing an exciter coil and a pair of pickup coils wound on the center and outer arms of an E-shaped iron core. As a movable pole piece shifts in the fields of the coils, each pickup coil transmits an alternating sine wave to the primary of a transformer, the signals from the two coils being 180° out of phase. The secondary leads of the transformer, across which a condenser is placed, lead to the grids of a double triode resistance-capacitance coupled amplifier. The anode output from this stage leads, preferably, to a second resistance-capacitance double triode amplifier. The leads from the anodes of the last amplifier stage go to the grids of a third double triode tube at the indicator or detector stage of the circuit. A meter or other indicating device is connected across the anodes of the indicator tube and is adjusted to zero position by a potentiometer associated with it.

Power is supplied to the anode-cathode circuit of the indicator tube in the form of 500 volt A. C. taken across the ends of the secondary of a power transformer whose primary is supplied with 60 cycle 110 volt alternating current. The anodes of the two amplifier stages are supplied with 125 volt rectified D. C. passing through an appropriate filter and taken across a cathode lead and a center tap of a conventional rectifying system. The excited coil of the pickup and the filaments of the three double triode tubes are supplied with alternating current from a secondary winding of the power transformer. It will be noted that the exciter coil and the secondary of the power transformer each are supplied with current of the same frequency and of the same or opposite phase, an important feature of the present invention.

Referring now to Figure 1 the circuit arrangement employed with the present invention is shown by block diagram in which the electronic components comprise a pickup unit, a transformer, a first and a second stage of resistance-capacitance coupled amplification leading into an indicator stage. The indicator stage in turn makes connection with a meter or other indicating device such as a recorder. A power supply provides the direct and alternating current required.

The pickup unit includes an exciter coil 10a wound on the center leg 10 of an E-shaped transformer iron core 12 that includes end legs 14 and 15 on each of which latter legs pickup coils 14a and 15a are wound. The exciter coil is energized by 60 cycle alternating current of the same or opposite phase as is supplied to the secondary of the power transformer of the power supply unit. Thus the alternating current supplied to the tubes and the alternating current supplied to the pickup unit bear the same or opposite phase relationship each to each. The pickup coils are connected in series so that the current flowing in one will be 180° out of phase with the current in the other. Normally these two currents will be of substantially the same value and will balance out but one will increase and the other will decrease as a movable iron pole piece 18 moves along its axis to improve the flux path between the leg 10 and one leg, as 15, at the expense of the flux path between the center leg 10 and the other end leg 14. This difference in the current flowing in the two coils is amplified and read at the indicator stage as hereafter described to afford the desired indication. The pole piece carries a detector arm or finger that contacts the work piece to be measured and its position with respect to the coils is due to movement of the arm or finger in seating itself against the work piece. This movement of the pole piece 18 thus takes place during a measuring operation in which a work piece to be measured is inserted between the anvil and detecting arm of a measuring instrument as outlined above.

The details of the operating circuit employed with the present invention are shown in Figure 2 although they may be modified in certain respects without departing from the scope of the invention that is limited solely by the appended claims. In this figure the exciter coil is again indicated at 10a and the pickup coils at 14a and 15a respectively, each of the coils being wound as described above on legs 10, 14 and 15 of the transformer iron core. The movable pole piece is again indicated at 18 and is mounted for movement on its long axis.

The outside leads from the two pickup coils that are connected in series are brought to a primary 20 of an iron core transformer the secondary of which is indicated at 22. The primary and secondary are connected as shown by a common lead. A tank circuit is formed by the inclusion across the secondary 22 of a condenser 23 and one side of this circuit is connected to ground and the other to the grid of a double triode tube 25, the other grid of the tube being connected to ground.

As indicated, the tube 25 forms the first of two stages of a resistance-capacitance coupled amplifier. Under certain circumstances no preamplification is required in advance of the indicator stage and in certain cases it is contemplated that more or less stages of amplification than are herein shown may be employed as circumstances require and without departing from the scope of the present invention.

The anodes of the tube 25 are connected through resistances into the lead 28 from the rectified D. C. plate supply (approximately 125 volts) from the power supply unit which as indicated includes a single-phase full-wave rectifier. The anodes also are connected through condensers as indicated to the grids of a second double triode tube 30 forming the second stage amplifier. The anodes of the tube 30 are in turn connected into the plate supply lead 28. In both stages of amplification the grid leads go through the resistances indicated to ground.

The indicator stage of the diagram makes use of a third double triode tube indicated generally at 40 the grids of which are connected as indicated to the anodes of the tube 30 and also through suitable resistances to ground.

A cardinal part of the present invention lies in the manner in which an indicating reading is made by connection of an instrument as indicated at M in Figure 2 across the anodes of the double triode indicator tube 40. The anodes of the tube 40 are connected through resistances as indicated and a potentiometer P to one side of a 250 volt secondary of a power transformer 50, the other side being connected through associated resistances to the cathodes. This is the same secondary across the center tap of which the plate supply for the tubes 25 and 30 is taken.

The circuit of this invention permits the use of a meter with a center zero together with indications on each side of center such that the scale may be linearly calibrated and the potentiometer permits adjustment of the meter pointer to zero. While a single double triode tube 40 has been shown it is possible to obtain a similar result with two matched single triode tubes, the plate or anode of each being connected to one lead of the meter M in the same way as are the anodes of the tube 40.

The cathodes of the three tubes are of the indirectly heated type and to this end are provided with heaters connected in the usual manner to a secondary 52 of the transformer 50. In the present invention the secondary 52 is so connected as to include leads 53a and 53b to the exciter coil 10a and leads 54a and 54b in parallel therewith to the heaters, connection being made in a well-known manner not further described. The cathode elements proper are connected through resistances and a lead 55 to the center tap of the secondary 56 of the transformer 50. It will be seen that the lead 55 forms one side of a filter circuit the other lead of which is indicated at 57 and connects with the lead 28 passing to the anodes of tubes 25 and 30. Rectification of current passing to the filter is obtained by a conventional rectifier tube 60 with a heater connected to a secondary 59 of the transformer 50 in the usual manner.

A variable resistance 65 is provided in the cathode circuit of the tube 25 to limit the amplifier gain. A similar result may be obtained by the modified circuits shown in Figures 3 and 4 in which the corresponding variable resistance is indicated at 65a and 65b respectively. In connection with this part of the circuit and either of the two modifications shown it is pointed out that as the value of the condenser 23 is increased the circuit sensitivity decreases; on the other hand the wave form is improved by suppressing some of the harmonics thus tending more toward the production of a pure sine wave input.

The resistances in the cathode leads of the tubes produce a certain amount of negative current feedback and to this extent reduce the output of the particular tube. On the other hand, the performance of the tube is stabilized and any effect of changes in the plate current is reduced.

The linear characteristic of the signal within its useful range and its symmetrical characteristics on either side of zero are shown in Figure 5 where the straight lines indicate the substantially linear and symmetrical response at the indicator stage that flattens off beyond a useful range to afford overload protection for the meter.

On Figure 2 are shown the capacitances and the resistance values of various components of the circuit. All values assigned to the condensers are expressed in microfarads. Most of the numerical values of the resistances are followed either by K or M, the former means 1,000 ohms and the latter means 1,000,000 ohms; those values without any letter are expressed in ohms. While the values given are those preferably employed it will be understood that minor changes may be made in their values without departing from the scope of the invention. The tubes 25 and 30 are of the type designated as 6SL7 while the tube 40 is designated as 6SN7; tube 60 is designated as 6X5.

From the foregoing description it will be seen I have provided a novel system of making measurements with accuracy and for performing other functions where a small amount of mechanical movement is to be amplified for interpretation by a measuring instrument.

I claim:

1. An indicating circuit comprising an exciter coil, a pair of pickup coils connected in series and opposite in phase with their end leads connected to the primary of a transformer, an indicator stage including a double triode tube, circuits connecting the grids thereof with the secondary of said transformer whereby the grids are 180° apart in phase, an indicating device across the anodes of said double triode tube, a potentiometer associated with said indicating device and connected to said double triode tube anode supply, a source of low frequency alternating current, and means to supply at the same phase or opposite phase part of said current to said exciter coil and part through said potentiometer to the anodes of said double triode indicator tube.

2. An indicating circuit comprising an exciter coil, a pair of pickup coils connected in series and opposite in phase with their end leads connected to the primary of an iron core transformer, at least one stage of resistance-capacitance coupled amplification including a double triode tube to the grids of which the leads of the transformer secondary are connected, a condenser across said leads to provide a tank circuit, means for altering the current supplied to the cathodes of said tube to control the amplifier gain and to provide negative current feedback, an indicator stage including a double triode tube with the grids thereof connected through condensers to the anodes of said amplifier tube whereby voltages proportional to and in the same phase relationship as the output of said series connected pickup coils are applied to said grids, said grids being 180° apart in phase, an indicating device across the anodes of said indicator tube, a potentiometer associated with said indicating device and connected to the indicator tube anode supply, a source of low frequency alternating current, and means to supply at the same phase or opposite phase part of said current to said exciter coil and part through said potentiometer to the anodes of said indicator tube.

3. An indicating circuit including a device for generating a single alternating signal of the same frequency as the current supplied to the device and which varies in amplitude and phase with movements of an element of said device, with leads from said device connected to the primary of a transformer, at least one stage of resistance-capacitance coupled amplification including a double triode tube to the grids of which the leads of the transformer secondary are connected, a condenser across said leads to provide a tank circuit, an indicator stage including two triodes having their grids connected to said amplifier tube, the voltage applied to said grids always being opposite in phase, an indicating meter connected to said triodes, and circuit means to supply low frequency alternating current of the same phase to the cathode-plate circuits of both said triodes and to supply part of said current at the same or opposite phase to said device.

4. An indicating circuit including a device for generating a single alternating current signal of the same frequency as the current supplied to the device and which varies in amplitude and phase with movements of an element of said device, with leads from said device connected to the primary of a transformer, at least one stage of resistance-capacitance coupled amplification including a double triode tube to the grids of which the leads of the transformer secondary are connected, means for altering the current supplied to the cathodes of said tube to control the amplifier gain and to provide negative current feedback, an indicator stage including two triodes having their grids connected to said amplifier tube, the voltage applied to said grids always being opposite in phase, an indicating meter connected to said triodes, and circuit means to supply low frequency alternating current of the same phase to the cathode-plate circuits of both said triodes and to supply part of said current at the same or opposite phase to said device.

5. An indicating circuit including a device for generating a single alternating current signal of the same frequency as the current supplied to the device and which varies in amplitude and phase with movements of an element of said device with leads from said device connected to the primary of a transformer, at least one stage of resistance-capacitance coupled amplification including a double triode tube to the grids of which the leads of the transformer secondary are connected, a condenser across said leads to provide a tank circuit, means including a variable resistance in the cathode supply circuit for altering the current supplied to the cathodes of said tube to control the amplifier gain and to provide negative current feedback, an indicator stage including two triodes having their grids connected to said amplifier tube, the voltage applied to said grids always being opposite in phase, an indicating meter connected to said triodes, and circuit means to supply low frequency alternating current of the same phase to the cathode-plate circuits of both said triodes and to supply part of said current at the same or opposite phase to said device.

6. An indicating circuit including a device for generating a single alternating current signal which varies in amplitude and phase in accordance with the position of an element of said device, and means for indicating the phase and amplitude of said signal, said means comprising two substantially identical electron tube means each embodying a cathode, a grid and a plate, circuit means for impressing an alternating voltage proportional to said signal on the grids of said electron means with the grids always 180° out of phase with each other, circuit means for supplying the same alternating current to the cathode-plate circuits of both said electron means, said current being in phase with the voltage on one of said grids and 180° out of phase with the voltage on the other of said grids, resistors in the plate circuits, and a D. C. meter connected across said plates and adapted to indicate the amplitude and phase of said signal current.

7. An indicating circuit including a device for generating a single alternating current signal which varies in amplitude and phase in accordance with the position of said device, and means for indicating the phase and amplitude of said signal, said means comprising two substantially identical electron tube means each embodying a cathode, a grid and a plate, circuit means for impressing an alternating voltage proportional to said signal on the grids of said electron means with the grids always 180° out of phase with each other, circuit means for supplying the same alternating current to the cathode-plate circuits of both said electron means, said circuit means including resistors in the cathode circuits of said electron means, said current being in phase with the voltage on one of said grids and 180° out of phase with the voltage on the other of said grids, resistors in the plate circuits, and a D. C. meter connected across said plates and adapted to indicate the amplitude and phase of said signal current.

MICHAEL BOZOIAN.

REFERENCES CITED

The following references are of record in the file of this patent:

UNITED STATES PATENTS

| Number | Name | Date |
|---|---|---|
| 2,270,991 | Bagno | Jan. 27, 1942 |
| 2,338,732 | Nosker | Jan. 11, 1944 |
| 2,407,140 | Coake | Sept. 3, 1946 |
| 2,408,039 | Busignes | Sept. 24, 1946 |
| 2,408,524 | Mestas | Oct. 1, 1946 |
| 2,416,517 | Farrow | Feb. 25, 1947 |
| 2,434,822 | Beuren et al. | Jan. 20, 1948 |